(12) United States Patent
Pedemonte (10) Patent No.: US 7,726,291 B2
(45) Date of Patent: Jun. 1, 2010

(54) DEVICE FOR RELEASING A SPEAR SHAFT OF A SPEAR GUN FOR SCUBA DIVING OR THE LIKE

(75) Inventor: Stefano Pedemonte, Genoa (IT)

(73) Assignee: Cressi-Sub S.p.A., Genoa (IT)

( * ) Notice: Subject to any disclaimer, the term of this patent is extended or adjusted under 35 U.S.C. 154(b) by 307 days.

(21) Appl. No.: 11/825,418

(22) Filed: Jul. 5, 2007

(65) Prior Publication Data

US 2008/0017177 A1 Jan. 24, 2008

(30) Foreign Application Priority Data

Jul. 5, 2006 (IT) .................. FI 2006 A 000172

(51) Int. Cl.
*F41B 7/04* (2006.01)
(52) U.S. Cl. ...................... 124/20.3; 124/25
(58) Field of Classification Search .......... 124/17, 124/20.1, 20.3, 22, 25, 31, 40
See application file for complete search history.

(56) References Cited

U.S. PATENT DOCUMENTS

| | | | | | |
|---|---|---|---|---|---|
| 4,192,281 | A | * | 3/1980 | King | 124/25 |
| 4,877,008 | A | * | 10/1989 | Troubridge | 124/25 |
| 5,649,520 | A | * | 7/1997 | Bednar | 124/25 |
| 5,904,132 | A | | 5/1999 | Biller | 124/22 |
| 6,425,386 | B1 | * | 7/2002 | Adkins | 124/31 |
| 6,736,123 | B1 | * | 5/2004 | Summers et al. | 124/25 |
| 6,802,304 | B1 | * | 10/2004 | Chang | 124/25 |

* cited by examiner

Primary Examiner—John Ricci
(74) Attorney, Agent, or Firm—Pollack, P.C.

(57) ABSTRACT

A device is provided for releasing a spear shaft of a spear gun for scuba diving or the like. The shaft has a latch element formed on a first lever pivotally connected at its front end to a screw attached to and integrally with a frame of the gun, the lever being maintained elastically in a resting position. The gun has a trigger with an abutment portion forced elastically against the front end of the first lever extending forward of a convex upper surface. The convex upper surface intersects a concave surface at an edge that traces a first circular trajectory when the trigger is rotated. A second lever is rotatably connected to the frame, the front end of the second lever being movable along a second circular trajectory intersecting the first circular trajectory. An arm of the second lever extends so as to intersect the trajectory of the spear shaft when it is loaded in the gun, such that the shaft abuts the latch element first, thereby moving the first lever away from its resting position, until it engages a shaped cavity of the shaft, and subsequently abuts the arm of the second lever. This causes the second lever to turn until it abuts the first lever in line with the latch element, simultaneously raising its front end up to and against the convex surface of the trigger. The front end of the first lever is slidingly connected to a screw, such that the first lever may be variably displaced, thereby adjusting the force applied by the second lever to the trigger.

15 Claims, 6 Drawing Sheets

DEVICE FOR RELEASING A SPEAR SHAFT OF A SPEAR GUN FOR SCUBA DIVING OR THE LIKE

FIELD OF THE INVENTION

The present invention relates generally to underwater activities and, more particularly, to spear guns for use in fishing, underwater hunting and the like..

BACKGROUND OF THE INVENTION

Conventional spear guns, such as those utilized in scuba diving, typically comprise a frame having a longitudinally elongated body mounting, at a rear end, a grip and a trigger. A shaft of a spear is mounted to a front end of the frame, the shaft being mounted slidingly on the elongated body of the frame. The spear is then launched toward a desired target, e.g., a fish, by pulling the trigger. The rear end of the shaft is usually connected to a string line for retrieval of the spear and any prey that may have been snagged by the diver.

The force for propelling the spear is provided by a pair of cables, made of an elastic material, that are stretched and hooked to the shaft of the spear when the diver loads the gun. Once the trigger is pulled, the spear is released, effecting conversion of the elastic energy accumulated by the elastic cables into kinetic energy in the spear shaft, and propelling the spear outwardly along the longitudinal axis of the gun.

The kinematic trigger mechanism that enables the diver to launch or shoot the spear generally comprises a lever hingedly mounted to the frame with a latch element at one end for engaging a notch at a proximal end of the spear's shaft when the spear is loaded on the gun so as to withstand a pulling force exerted on the shaft by the elastic cables. During loading, the proximal end of the shaft abuts a radial appendage on the lever, thereby inducing its rotation, Such rotation results not only in engagement of the latch member with the notch on the shaft, but also of the opposite end of the lever elastically within a seat in the trigger formed on the side opposite its operating arm. Disengagement of the lever from the trigger, induced when a diver's finger pulls on the operating arm, causes the shaft to be released from the latch element and the propulsive force of the elastic cables prevails.

The kinematic chains often used to operate spear guns, though useful, do not permit adjustment of the stroke of the trigger nor of the force necessary to pull it. If the stroke of the trigger is short, and the spear gun is operated by an inexperienced scuba diver who lacks a feel for the trigger, or in the event of other circumstances such as a diver's use of very thick gloves, the spear may be accidentally released. Simply put, adjustments of the trigger's stroke and/or graduating the effort required for a diver to pull the trigger has been found difficult and has yet to provide a solution that is both safe and simple.

OBJECTS AND SUMMARY OF THE INVENTION

Accordingly, it is an object of the present invention to provide a device for releasing a spear shaft of a spear gun for scuba diving or the like that allows the operating stroke of the trigger and/or the effort necessary to pull the trigger to be graduated in accordance with a selected diver's characteristics and needs.

Another object of the present invention is to provide a device for releasing a spear shaft of a spear gun that provides for quick and easy adjustment of the trigger's stroke and/or of the force necessary to pull the trigger through use of a kinematic chain that is neither complicated to manufacture nor to assemble.

According to one apsect of the present invention, there is provided a device for releasing the spear shaft of a spear gun for scuba divers. The gun comprises a frame having a longitudinally elongated body for supporting the shaft, terminating with a grip portion and an underlying trigger connected pivotally to the frame. Elastically opposed operation of the trigger is configured so as to release a latch element engaged with a shaped recess formed in a rear end of the shaft so as to withstand a pulling force exerted axially along the shaft by an elastic member connected to the frame that provides a propulsive force for launching the spear. The latch element is formed on a first lever pivotally connected at its front end to a stem attached to the frame and generally parallel to the longitudinal axis. The elastic member maintains the first lever in a resting position, at which the gun is not loaded. The latch element abuts a first shoulder attached to and integrally with the frame and is aligned axially relative to the shaft when it is ready for loading a spear in the elongated body of the frame. The trigger comprises an abutment portion biased elastically against the front end of the first lever and extends forward of a convex upper surface intersecting a concave surface at an edge which, upon rotation of the trigger, traces a first circular trajectory. A second lever is pivotally connected to the frame at a point generally behind the latch element and below the front end of the first lever, the front end of the second lever being displaceable along a second circular trajectory that intersects the first. An arm of the second lever extends so as to intersect the trajectory of the shaft as it is loaded in the gun, whereupon axial movement in loading the spear, the spear shaft first abuts the latch element, thus moving the first lever away from its resting position, and then comes to a loaded position, wherein the latch element engages the shapes recess and abuts the arm of the second lever, causing it to rotate until it abuts the first lever at the latch element, simultaneously raising its front end up to and against the convex surface of the trigger. The front end of the lever is slidingly connected to the stem such that the first lever is adjustably displaceable in the direction of the longitudinal axis so as to vary the point at which the first lever rests against the second lever, and thereby adjust the force with which the front end of the second lever rest against the convex surface of the trigger.

BRIEF DESCRIPTION OF THE DRAWINGS

A specific, illustrative device for releasing a spear shaft of a spear gun, according to the present invention, is described below with reference to the accompanying drawings, in which.

DETAILED DESCRIPTION OF THE INVENTION

As set forth herein, illustration of spear guns for scuba divers is restricted generally to the elements that comprise a device for releasing a spear shaft of the spear gun, according to various apsects of the present invention. Consequently, swivel pins for articulation of the various component parts, and abutment elements for the moving parts, are shown schematically only. The pins and abutment elements are attached integrally to the frame of the gun, which is not shown in its entirety, the remaining structural and functional aspects of spear guns being known by those skilled in the art. As their further description is considered unnecessary for illustration of the present invention, the foregoing discussion is not intended to limit the environment.

Referring now to the drawings and, more particularly, to FIGS. 1-6, there is shown generally a specific, illustrative device for releasing a spear shaft of a spear gun for scuba diving or the like, according to various aspects of the present invention. In one embodiment, illustrated in FIG. 1, there is shown a cross-sectional view of two bushings S1 and S2, respectively, attached to and integrally with the frame. Abutment elements S4, S5, S6, S7 and S8 are also attached to and integrally with the frame, and are thus in a fixed position as well. In this manner, motion of movable parts or elements of the device is contained. Generally speaking, the movable elements include a first lever L1, a second lever L2 and a trigger L3 articulated, respectively, about pins C1, C2 and C3, attached to and integrally with the frame.

More particularly, second lever L2 and trigger L3 have a flattened shape and lie substantially in a vertical plane of symmetry of the gun, passing through its longitudinal axis X. First lever L1, on the other hand, comprises two symmetrical elements (only one of which is shown), lying parallel to the plane of symmetry of the gun, the distance between them corresponding to at least the thicknesses of second lever L2 and of trigger L3 so that the latter two elements can move without interfering with movement of lever L1.

In general, the terms "front" and "rear", as set forth herein, are intended to refer to orientation of the gun to the left and right ends, respectively, as the spear gun appears, for instance, in FIGS. 1-6, The words "upper" and "lower" are intended to make reference, for example, to the axis of longitudinal symmetry of the gun. More specifically, the shaft and spear point are located in an upper part of the gun, i.e., above its axis of symmetry, whereas the trigger is typically positioned in alower part of the gun.

Bushings S1 and S2 support a freely-revolving longitudinal threaded stem 10. The rear end of the stem (facing the right-hand side in the drawings) is threaded inside and screws into a corresponding threaded hole in a transverse hub 11 from either side of which two transverse, symmetrical pins C1 project (only one of which is shown) about which the two parallel and adjacent elements forming first lever L1 are integrally articulated.

For simplicity, alternatively or concurrently, reference is made hereinafter to C1 as a single pin as if first lever L1 comprises a single element.

Preferably, the axis of threaded stem 10 lies substantially along the vertical plane of symmetry of the gun. Between bushings S1 and S2, threaded stem 10 has a ring-shaped ribbing 12, the knurled lateral surface of which extends from the bushings and enables the scuba diver to turn the threaded stem, thereby screwing or unscrewing its end into and out of, respectively, the threaded hole in hub 11. This, in turn, effects displacement of the axial position of transverse pin C1 in the two directions indicated by double line F1. As shown in FIGS. 1-5, for instance, the tranverse pin occupies its rearward most position, whereas in FIG. 6 the pin is at an end of its forward stroke.

While first lever L1 is hinged about tranverse pin C1 at its front end (on the left-hand side of the drawing), it is mounted at its rear end by a freely-revolving wheel 14. The upper side of the rear end of the first lever terminates with a surface 13 designed to be pushed up against a shoulder S6, which is attached integrally to the gun frame. When surface 13 and shoulder S6 are in contact with one another, they define the end of a stroke of the first lever in its counterclockwise or leftward-turning angular displacement, such corresponding to a starting or resting position of the lever , when the gun is not loaded.

The rear end of the second lever L2 is connected to swivel pin C2, located to the rear of wheel 14 and on a slightly lower level than transverse pin C1. Counterclockwise rotation of the second lever is limited by a shoulder S4. The swivel pin is wrapped within the turns of a spring M2, which terminate with lower and upper arms 15 and 16, respectively. Lower arm 15 is retained by a pair of fixed striker plates S5, while upper arm 16 rests up against wheel 14 of first lever L1, thereby pushing lever surface 13 toward shoulder S6. In addition, upward-facing bracket 20 extends from the rear end of second lever L2.

The front of trigger L3, which rotates about pin C3, has a front concave surface 51, against which the scuba diver's finger bears, a convex, cylindrical surface 39, having an axis coincident with that of pin C3, and an upper-rear concave, circular surface 38 with a radius of curvature equal to the distance between the axis of swivel pin C2 and front end 18 of second lever L2. At a suitable angle of counterclockwise rotation of the trigger, concave circular surface 38 overlaps a trajectory T2 traced by end 18 of second lever L2 as it moves to the right. In the position of the trigger, an edge 40 common to surfaces 38, 39, which edge traces trajectory T3, coincides with point T, where trajectories T2 and T3 intersect one another.

Clockwise rotation of the trigger is limited by a ledge 19 thereof resting up against hub 11. A spring M3 is wrapped around pin C3, with a lower arm 21 pushing trigger L3 to turn clockwise toward its end of stroke, wherein the ledge rests up against the hub. An upper arm 22 of spring M3 rests elastically against a lower edge of first lever L1, co-operating with the spring in pushing the first lever into its endmost counterclockwise position, at which surface 13 is in contact with shoulder S6.

Figure 1:
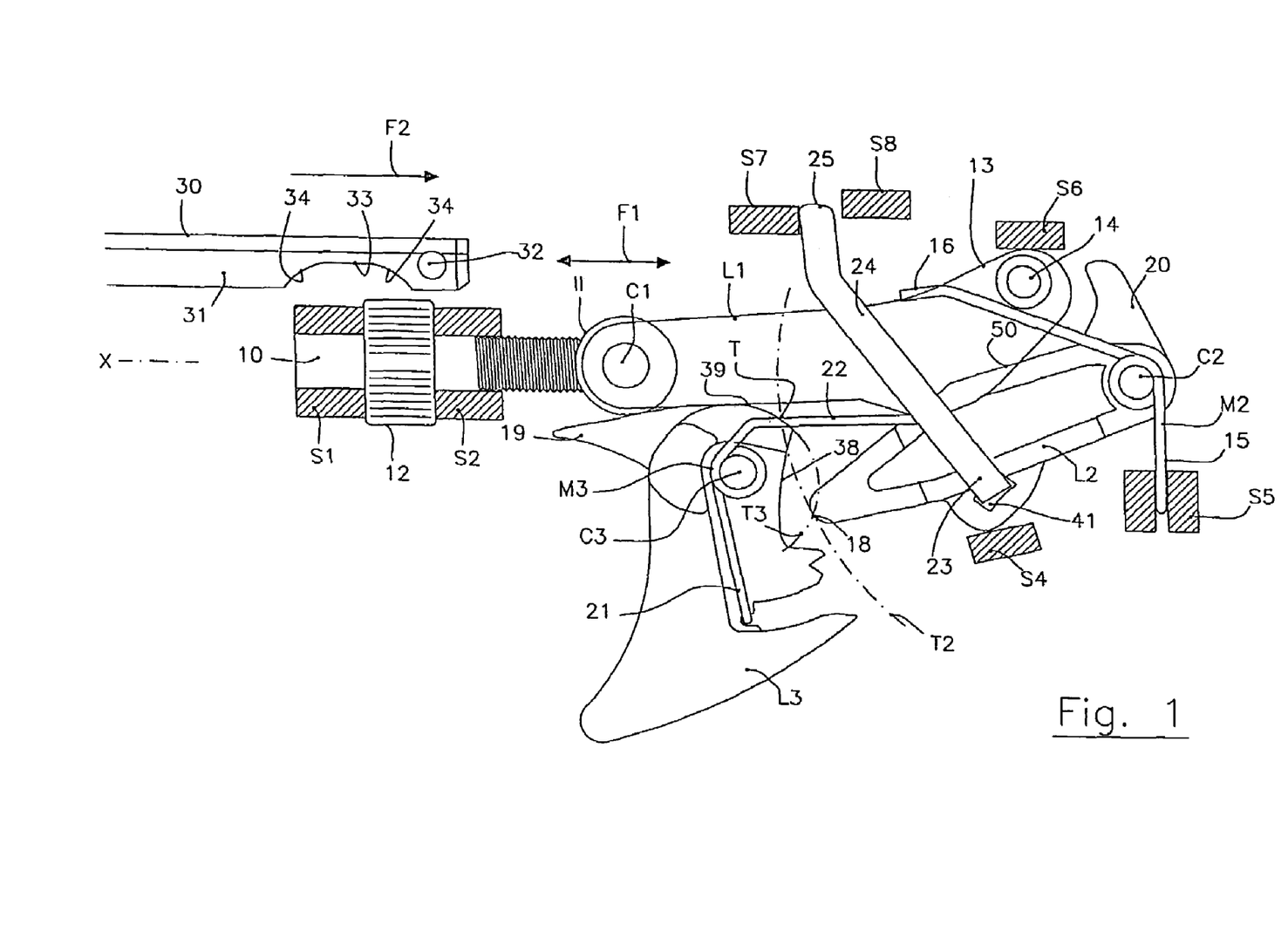
FIG. 1 shows schematically a longitudinal section of a device for releasing a spear shaft of a spear gun, according to one aspect of the present invention, in a resting position, ready for loading with a spear.
Figure 4:
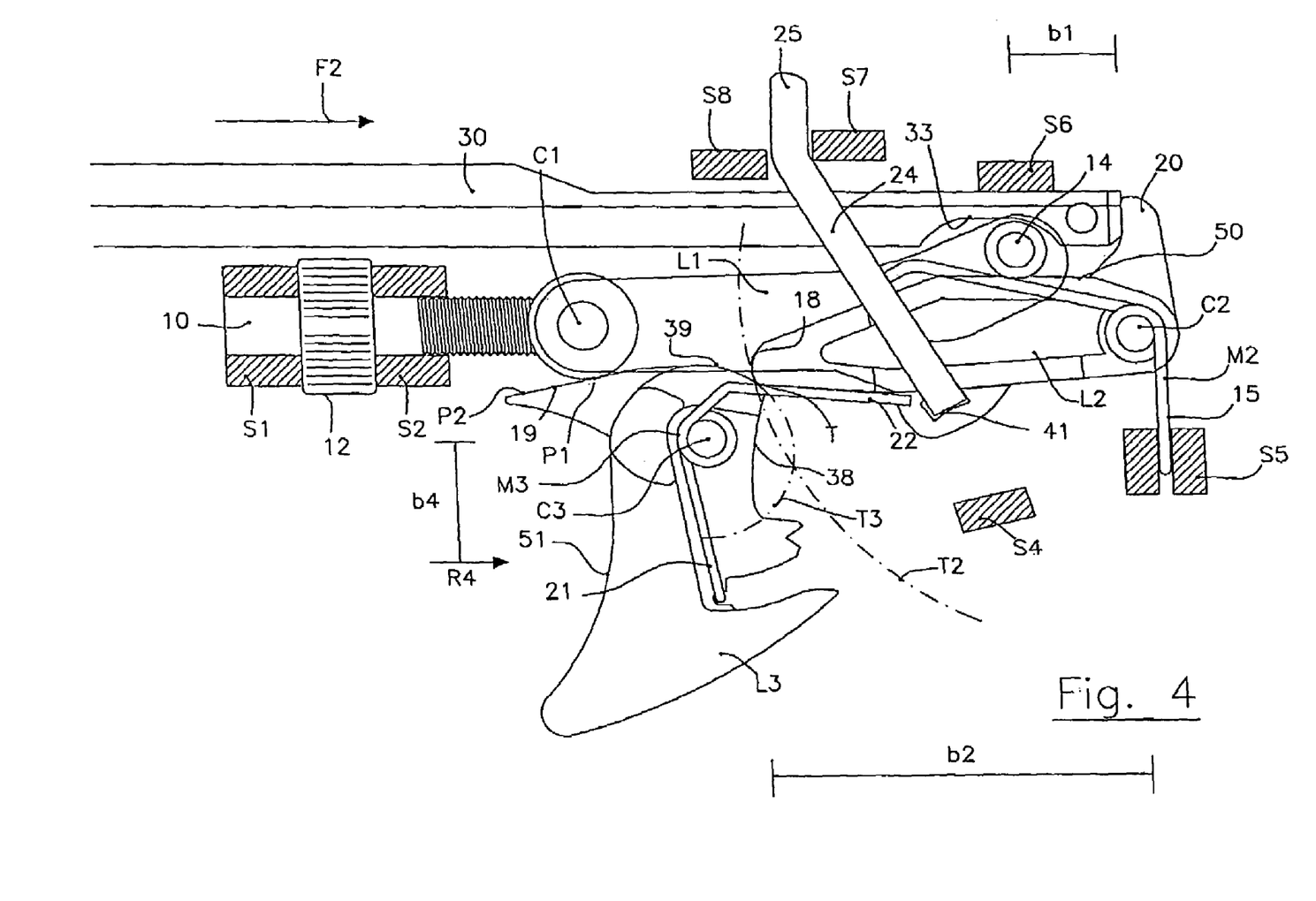
FIG. 4 shows the device of FIG. 2 with the spear shaft in a fully loaded position.

A lower end 23 of a stem 24 is housed, with looseness or play angularly, in a seat 41 in second lever L2, upper end 25 of the stem being retained between striker plates S7 and S8. When the device, according to the invention, is in the resting position, as shown in FIG. 1, stem 24 is withdrawn, i.e., it does not extend beyond striker plates S7 and S8, whereas upon loading the gun with a spear, as shown in FIG. 4, the stem projects beyond the striker plates. Upper end 25 serves as a transmission element for a string line (not shown) that links rear end 31 of spear shaft 30 to the gun frame through a hole 32 in the shaft to which one end of the line is attached. On the underside of rear end 31, an elongated recess 33 is formed, the recess having tapered sides 34.

Figure 2:
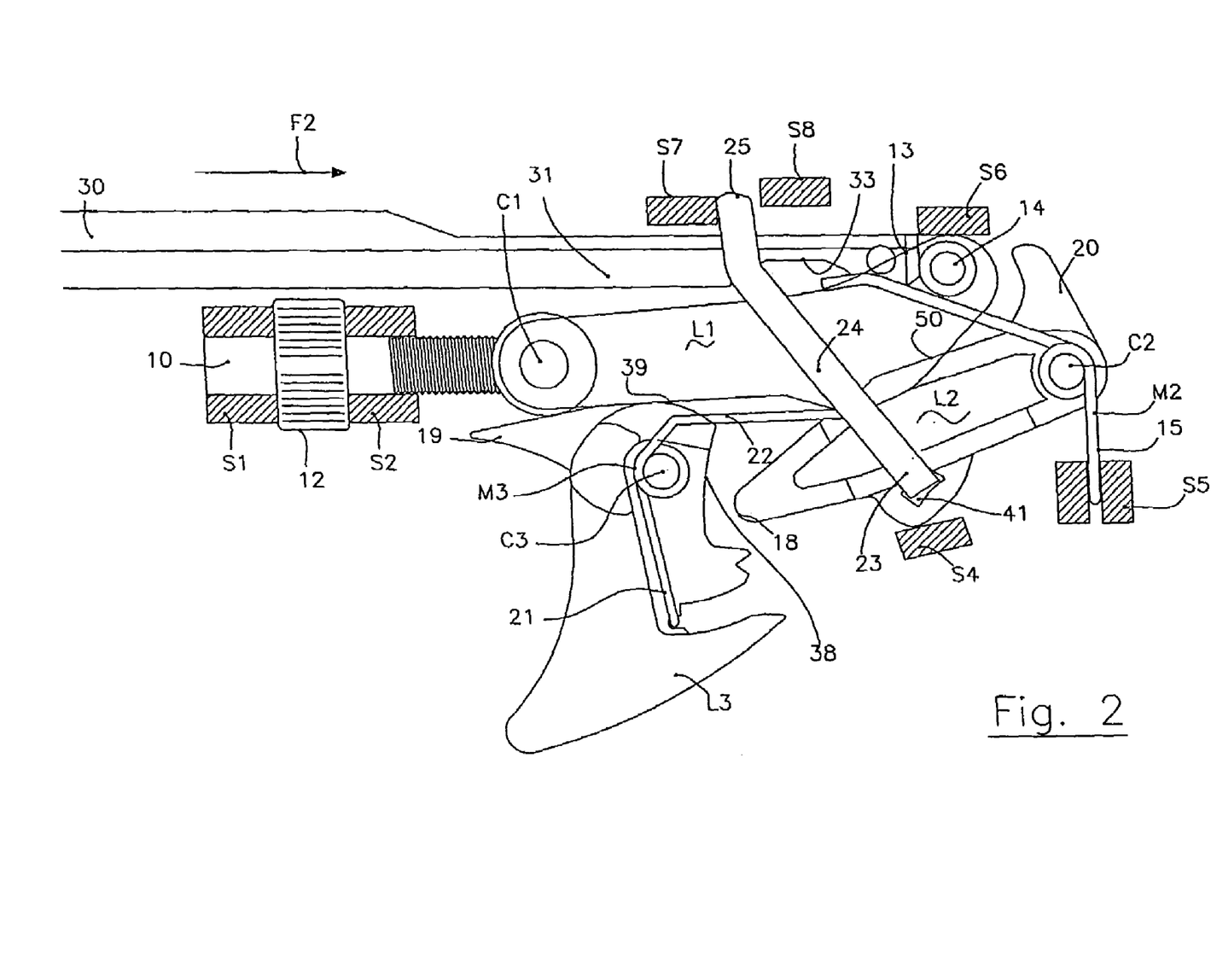
FIG. 2 is a side view of the device illustrated in FIG. 1, in an intermediate position with the spear shaft being loaded.

To load the gun, the spear shaft is pushed along the gun, in the direction of arrow F2, its rear end 31 rests up against wheel 14 of lever L1, illustrated generally in FIG. 2. At the point shown, levers L1 and L2, trigger L3, stem 24 and springs M2 and M3 are still in the positions shown in FIG. 1.

Figure 3:
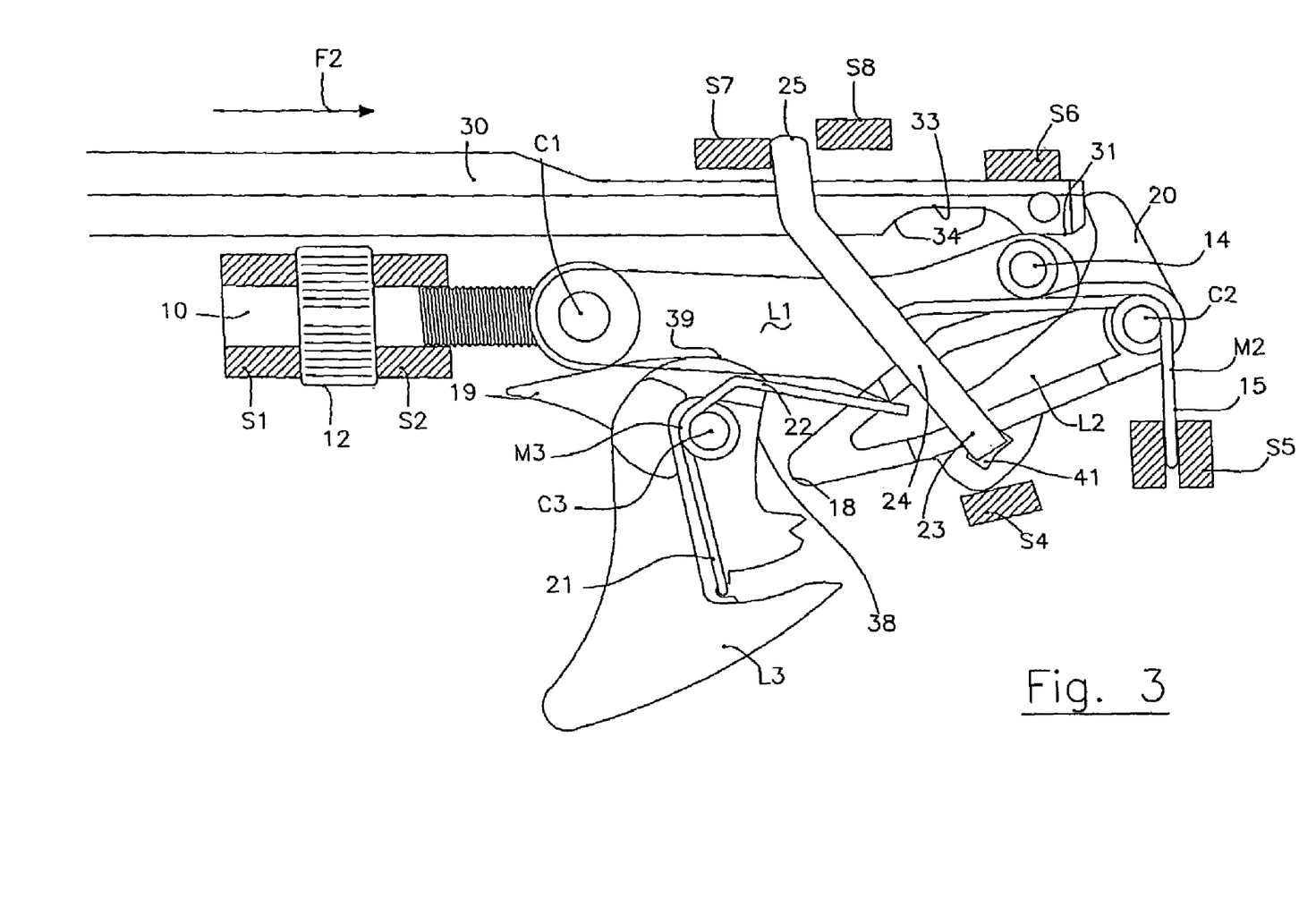
FIG. 3 shows the device of FIG. 2 in a further intermediate position, with the spear shaft in a more advanced phase of loading.

As movement of spear shaft 30 continues along the loading trajectory, generally in the direction of arrow F2, best seen in FIG. 3, it rides over the wheel, which is thus pushed downwardly, overcoming the elastic force of springs M2 and M3 and causing first lever L1 to rotate to the right. In this position of shaft 30, its rear end 31 rests against, but does not displace, the end of bracket 20 on second lever L2. Second lever L2, trigger L3, and stem 24 are still in the positions shown in FIGS. 1 and 2, while the angle coming between the arms of springs M2 and M3 is reduced due to the effect created upon lowering first lever L1 to the end of its clockwise rightwardly turning stroke.

Figure 6:
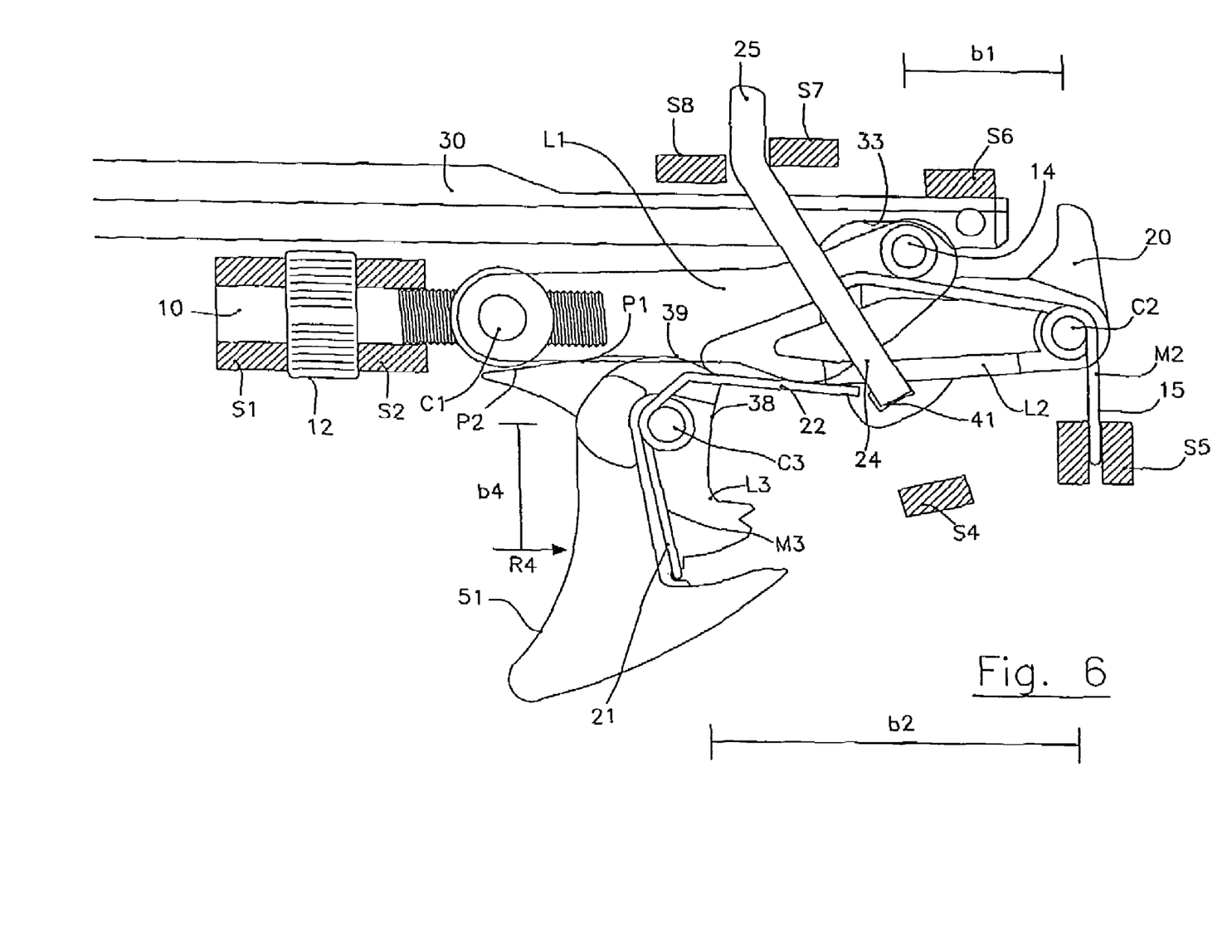
FIG. 6 shows the device in a similar condition to that in FIG. 4, but with a different degree of adjustment to the effort necessary for a user to pull the trigger.

With reference to FIG. 4, as displacement of the shaft continues further in the direction of arrow F2, the shaft is forced against bracket 20, effecting rotation of second lever L2 to the right until it reaches the end of its stroke. Notably, as also shown in FIG. 6, in its endmost position, the shaft does not necessarily remain in contact, at its rear end, with the bracket.

As best seen in FIG. 4, in the final position of shaft 30, wheel 14 rises inside recess 33 due to the effect of spring M2, reaching an intermediate position relative to the terminal or endmost position illustrated in FIG. 1, so that first lever L1 rotates partially to the left, albeit without reaching the initial position shown in FIG. 1.

As second lever L2 turns to the right, driven by the rear end of the shaft, its front end 18 slides along upper rear surface 38 of trigger L3 causing the trigger to turn in a counterclockwise direction, overcoming the force of spring M3, until the front end passes beyond point 40, thus enabling trigger L3, through the biasing force of spring M3, to return to the position shown in FIGS. 1 - 4. Upon completion of this rightward rotation, toward the initial position of trigger L3 (See FIG. 1), front end 18 of second lever L2 rests up against surface 39 and occupies a position substantially parallel to the longitudinal axis of the gun, with its upper surface 50 coming up against wheel 14.

A leftwardly acting axial tensile force, as come to bear on shaft 30 in its loaded position (See FIG. 4), is transmitted via surface 34 interfacing with the recess to the wheel and through its upper surface 50 to second lever L2. This force generates a lever or moment arm b1, balanced by lever or moment arm b2 generated by the force with which end 18 of lever L2 rests against surface 39 of the trigger. The force needed to turn the trigger clockwise, or to the left, must, therefore, generate a torque capable of exceeding that created by the force of friction at the point of contact between end 18 of lever L2 and surface 39 of the trigger. It is considered particularly noteworthy that clockwise rotation of the second lever results in upward displacement of stem 24, an upper end 25 of the stem extending above striker plates S7 and S8. This enables the string line that joins end 25 to the shaft of the spear to be hooked.

Figure 5:
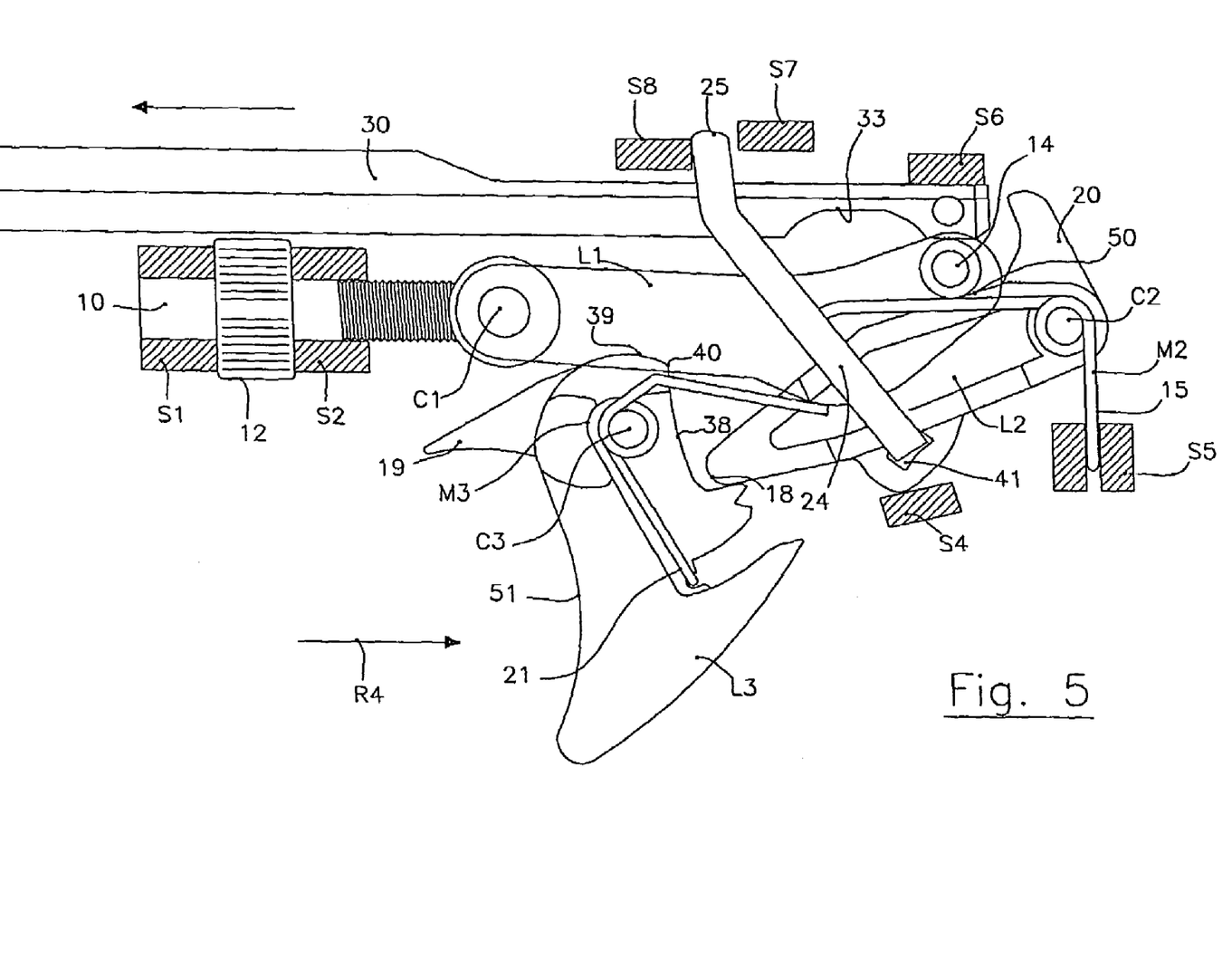
FIG. 5 shows the device of FIG. 2 with the spear shaft in a position immediately after the trigger is pulled.

Turning now to FIG. 5, the end of a stroke of trigger L3 is shown under the effect of a force R4 exerted by the scuba diver's finger on trigger surface 51. Exertion of this force causes first lever L1 to release spear shaft 30, the tensile stress exerted by the elastic cables, which are now disengaged, causes a leftward stroke of the first lever, thereby restoring the first lever and wheel 14 to the positions illustrated in FIG. 3. As the shaft continues its displacement to the left, the movable elements of the device return to the positions shown generally in FIG. 1. As set forth above, force R4 overcomes the force of friction at the point of contact between end 18 of second lever L2, and surface 39 of trigger L3, effecting counterclockwise rotation of the trigger and releasing the second lever, which lever also rotates in a counterclockwise direction through the biasing force of spring M2, until the lever abuts shoulder S4.

To adjust the device, i.e., the effort necessary to pull the trigger initially, as shown in FIG. 4, the upper rear portion of ledge 19 rests against hub 11 at point P1. As also illustrated in FIGS. 2 and 5, the hub is in its rearward most position.

If threaded stem 10 is then screwed down into the threaded hole in the hub - by acting on knurled ring 12 - until the hub reaches its forward most position, (See FIG. 6), the point of contact between the hub and the ledge changes to P2. Hence, moving the position of tranverse pin C1 to the left increases the torque necessary to pull trigger L3, namely, by overcoming the frictional torque generated by the force with which end 18 of second lever L2 presses against surface 39 of the trigger.

Moreover, since the upper rear portion of ledge 19 is convex, displacement of the point of contact to the left involves clockwise angular displacement of second lever L2 such that the angular displacement of the trigger required to release shaft 30 also increases.

Upon exertion of a force R by shaft 30 on wheel 14, where R1 is the force component applied to second lever L2, the resulting moment M1 is determined by the expression $M1=R1*b1$, where b1 is the lever arm corresponding to the distance of the line of action of force R1 from the axis of rotation of swivel pin C2. Moment M1 is, in turn, balanced by a second moment M2 according to the expression $M2=R2*b2$, where R2 is the force applied by end 18 of second lever L2 on surface 39, and b2 is the corresponding lever arm relative to the axis of the swivel pin.

For trigger L3 to be turn or rotated, it is necessary to overcome a torque M3 determined by the expression $M3=R3*b3=f*R2*b3$, where f is the coefficient of friction between elements 18 and 39, and b3 is the radius of curvature of circular surface 39 concentric to the axis of pin C3. In other words, the scuba diver must exert a torque M4 on the trigger in order to make it turn, calculated from the expression $M4=R4*b4$, where R4 is the force applied by the scuba diver's finger on front surface 51 of the trigger and b4 is the lever arm of the force relative to the axis of pin C3. Hence, $R4=R1*f*b1*b3/(b2*b4)$, where the only variable is lever arm b1, which increases when hub 11 is shifted to the left, as seen in the drawings, i.e., toward the front end of the gun, when threaded stem 10 is screwed into the threaded hole in the hub.

Accordingly, it is now possible to vary the force required to pull the trigger, between a minimum (See FIG. 4) and a maximum (See FIG. 6). Moreover, when the force necessary to pull the trigger has been increased, the angular displacement required for the trigger to release shaft 30 also increases, given the greater extent of sliding action needed of end 18 over surface 39 before such end reached edge 40 of the trigger.

Overall, the present invention is especially advantageous in providing a device for releasing a spear shaft of a spear gun that allows the operating stroke of the trigger and/or the effort needed to pull the trigger to be graduated in accordance with a selected diver's charateristics and needs. It also provides for quick and easy adjustment of the trigger's stroke and of the force necessary to pull the trigger by using a kinematic chain that is neither complicated to manufacture nor assemble. The effect of this adjustment is not only beneficial in that it is maximized when the spear shafts associated with a particular gun are used, but also in allowing different shafts to be used, even if elongated recess 33 of such a shaft differs slightly in shape or position.

Various modifications and alterations to the present invention may be appreciated based on a review of this disclosure. These changes and additions are intended to be within the scope and spirit of the invention as defined by the following claims.

What is claimed is:

1. A device for releasing a spear shaft of a spear gun, the gun comprising a frame having a longitudinally elongated body for supporting the shaft, and terminating with a grip portion and an underlying trigger connected pivotally to the frame, elastically opposed operation of the trigger being configured so as to release a latch element engaged with a shaped recess formed in a rear end of the shaft so as to withstand a pulling force exerted axially along the shaft by an elastic member connected to the frame that provides a propulsive force for launching the spear, wherein the latch element is formed on a first lever pivotally connected at its front end to a stem attached to the frame and generally parallel to the longitudinal axis, the elastic member maintaining the first lever in a resting position at which the gun is not loaded, the latch element abutting a first shoulder attached to and integrally with the frame and being aligned axially relative to the shaft when it is ready for loading a spear in the elongated body of the frame; the trigger comprising an abutment portion forced elastically against the front end of the first lever and extending forward of a convex upper surface intersecting a concave surface at an edge which, upon rotation of the trigger, traces a first circular trajectory; a second lever being pivotally connected to the frame at a point generally behind the latch element and below the front end of the first lever, the front end of the second lever being displaceable along a second circular trajectory that intersects the first circular trajectory, an arm of the second lever extending so as to intersect the trajectory of the shaft as it is loaded in the gun, whereupon axial movement in loading the spear, the spear shaft first abuts the latch element, thus moving the first lever away from its resting position, then comes to a loaded position, wherein the latch element engages the shaped recess and abuts the arm of the second lever, causing it to rotate until it abuts the first lever at the latch element, simultaneously raising its front end up to and against the convex surface of the trigger, the front end of the first lever being slidingly connected to the stem such that the first lever is adjustably displaceable in the direction of the longitudinal axis so as to vary the point at which the first lever rests against the second lever and thereby adjust the force with which the front end of the second lever rests against the convex surface of the trigger.

2. The release device set forth in claim 1, wherein the stem has a threaded portion screwed into a hub on which at least one swivel pin is mounted, the first lever being pivotally attached to the swivel pin.

3. The release device set forth in claim 2, wherein the hub is formed with a threaded through hole into which the threaded stem is screwed; the threaded stem being pivotable, through a knurled ring, in an axially fixed position between a pair of bushings.

4. The release device set forth in claim 3, wherein the abutment portion on the trigger is a ledge projecting forwardly from its upper end, so as to support the hub.

5. The release device set forth in claim 4, wherein the upper surface of the ledge is convex such that any variation in axial position of the hub coincides with a variation in the angular forward most position of the trigger and varies the angular displacement needed for the front end of the second lever to reach the edge where the convex and concave surfaces of the trigger intersect, thereby releasing the spear shaft.

6. The release device set forth in claim 1, wherein the concave surface is formed along the rear side of the trigger and is an arc of a circle whose nominal radius is generally equal to the radius of the trajectory of the second lever's front end.

7. The release device set forth in claim 6, wherein the convex surface is formed along the upper side of the trigger and forms an arc of a circle concentric with its axis of rotation.

8. The release device set forth in claim 1, wherein the elastic member acting on the first lever is coaxial with the swivel pin of the second lever.

9. The release device set forth in claim 1, wherein the trigger includes an elastic member coaxial with its swivel pin and arranged between the trigger and the first lever.

10. The release device for set forth in claim 9, wherein the first lever is pivotally mounted to a swivel pin on a hub formed with a threaded through hole into which the threaded stem is screwed, the threaded stem being pivotable in an axially fixed position between a pair of bushings.

11. The release device set forth in claim 10, wherein a ledge projects forwardly from the upper end of the trigger and acts as a support for the hub.

12. The release device set forth in claim 11, wherein the upper surface of the ledge is convex, whereby any variation in the axial position of the hub corresponds to a variation in the angular forward-most position of the trigger and varies the angular displacement needed for the front end of the second lever to reach the edge where the convex and concave surfaces of the trigger intersect, thereby releasing the spear shaft.

13. The release device for set forth in claim 1, wherein the trigger and the second lever lie in a vertical plane containing a longitudinal axis of symmetry of the gun and the first lever comprises two halves extending generally parallel to and symmetrically with the axis and at a distance corresponding to at least the thickness of the trigger and the second lever so as to enable free movement of the first lever relative thereto.

14. The release device set forth in claim 1, wherein the latch element is provided at the rear of the first lever and comprises a wheel on which the rear end of the shaft can slidingly engage.

15. The release device set forth in claim 1, wherein a stem extends from the second lever, lying on the vertical plane of symmetry and slidingly connected to the frame, with one end configured to project from the frame when the device is loaded so as to enable the winding of a string line for the spear.

* * * * *